S. D. HAJJAR.
DEVELOPING CAMERA.
APPLICATION FILED MAY 8, 1909.

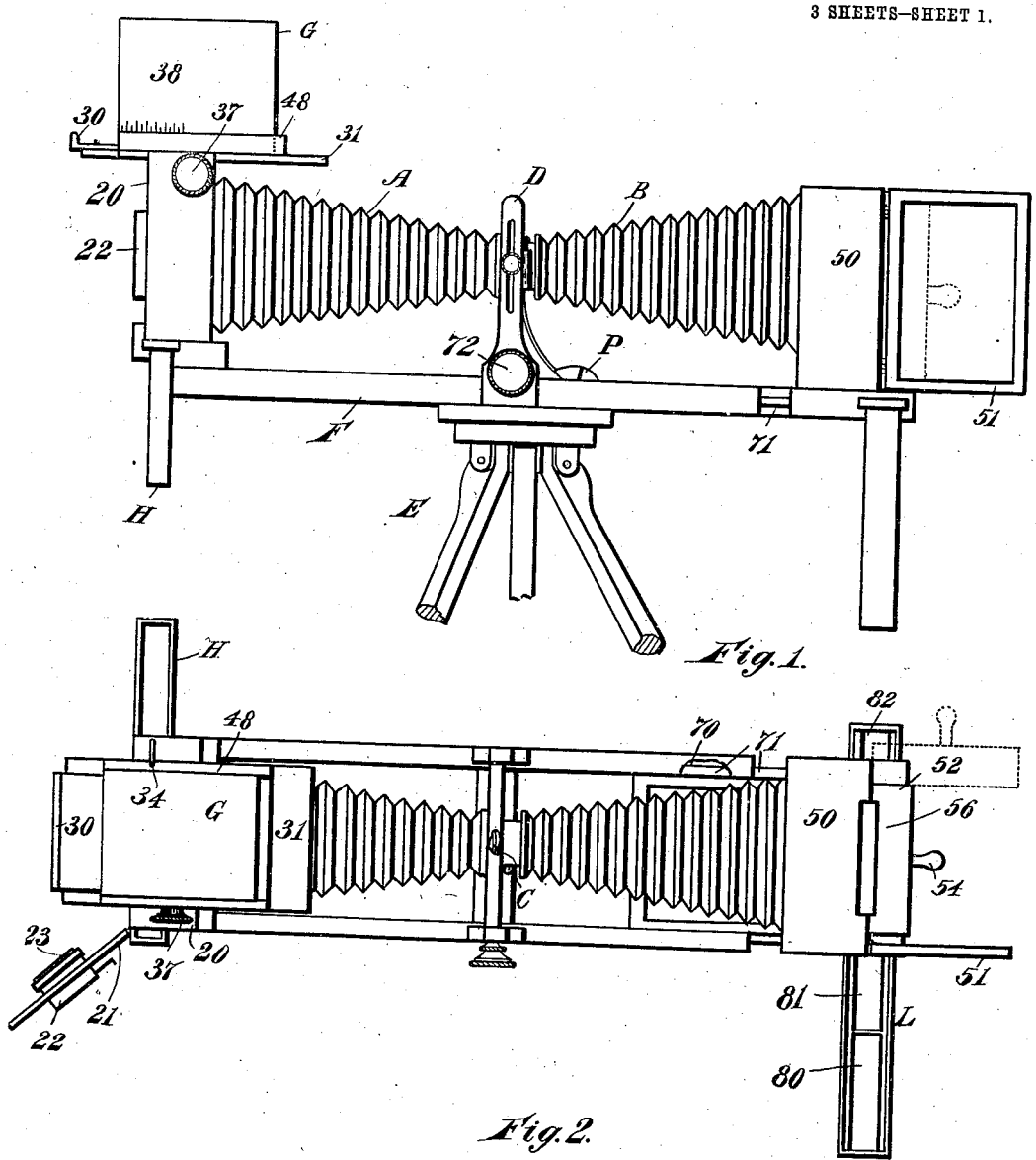

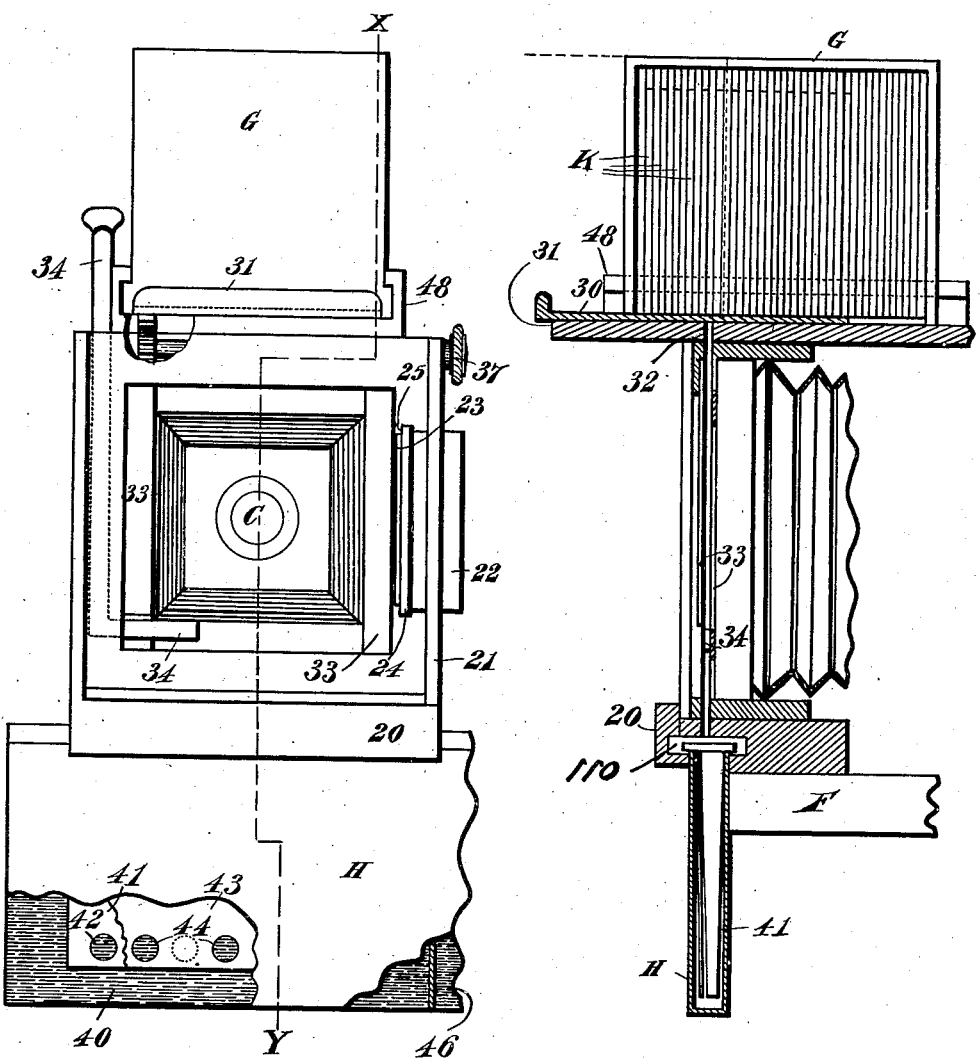

1,031,786.

Patented July 9, 1912.
3 SHEETS—SHEET 3.

WITNESSES:
Sudger A. Nicol
Noelland D. Davis

INVENTOR:
Solomon D. Hajjar
BY
Gardner W. Pearson
ATTORNEY.

UNITED STATES PATENT OFFICE.

SOLOMON D. HAJJAR, OF LAWRENCE, MASSACHUSETTS.

DEVELOPING-CAMERA.

1,031,786.  Specification of Letters Patent.  Patented July 9, 1912.

Application filed May 8, 1909. Serial No. 494,802.

*To all whom it may concern:*

Be it known that I, SOLOMON D. HAJJAR, a citizen of the United States, residing at Lawrence, in the county of Essex and State of Massachusetts, have invented certain new and useful Improvements in Developing-Cameras, of which the following is a specification.

My invention relates to cameras.

The purpose of my invention is the production of a camera in which the negative can be readily developed, and in which, without drying the negative, a print can be made and this print developed.

The main principle of my invention is the use of a double camera with a lens at the center. The negative is taken in substantially the usual way, while the other end of the double camera is open. The negative is then developed in the camera by dropping it successively into suitable baths and by then raising it to its original position. The other end of the double camera is now closed, the negative end is opened, and the focus for the image of the wet negative is obtained upon a suitable glass door. After this is done, the glass door is opened, a sensitive sheet is placed in position, the shutter is snapped or opened and the print is taken from the negative through the lens on this sheet. This sheet is then developed in the camera by dropping it successively into suitable baths.

Figure 5:
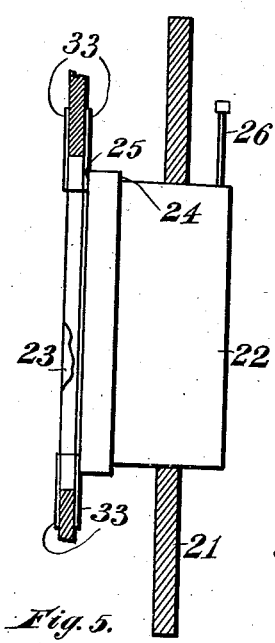
Figure 7:
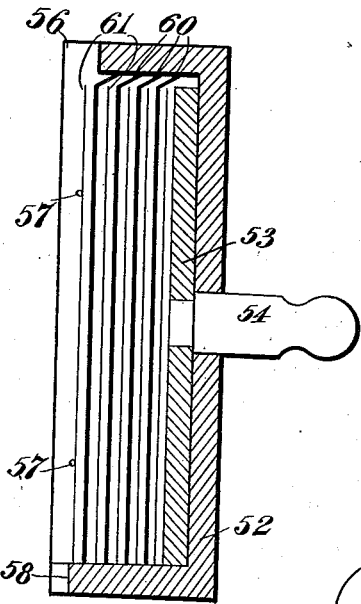
Figure 6:
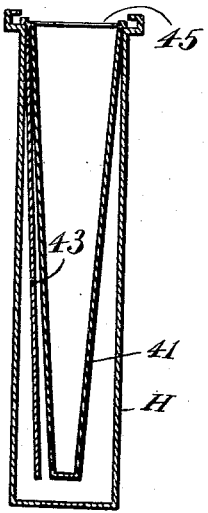
Figure 8:
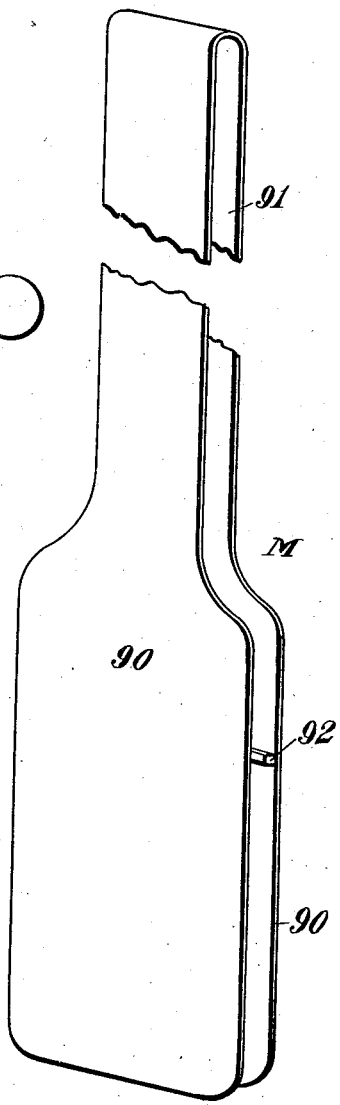

In the drawings, Figure 1, is a side view of the camera with the negative focusing door closed and the positive end open. Fig. 2 is a top view with the negative and positive focusing doors open and the sheet holder closed. Fig. 3 is a detail of the negative or plate end from the back. Fig. 4 is a section of part of Fig. 3 on line X—Y. Fig. 5 is a detail of the focusing frame and door. Fig. 6 is a detail of the bath plate carrier and negative developing tank. Fig. 7 is a section of the sensitive sheet magazine, the sheets being exaggerated to show the construction. Fig. 8 is a perspective view of the sheet tongs.

A is an ordinary collapsible camera bellows which I will call the negative bellows. B is a similar collapsible bellows, which I will call the positive bellows. These are joined at the lens C, which is carried by the slide D of the usual construction. Lens C is provided with a shutter of the usual construction operated by bulb P.

E is a tripod of the usual construction which supports the base frame F which is similar to the usual construction, but of double the usual length. Frame F however is grooved at 70 to receive sliding frame 71 which carries box 50 to be described. Preferably an adjusting or focusing stud 72 is used to move slide D back and forth to get the focus.

At the large end of negative bellows A, is the box 20, which is closed at the back by a hinged opaque focusing door 21, in which is a suitable square opening. In this opening is a slidable focusing frame 22, which carries in its front part a piece of ground glass 23 upon which the focus for the negative is made. This frame 22 is preferably provided with a rim 24 which limits its outward movement. It can be focused at a point directly under where the negative plate is to be.

G is a negative plate magazine, and is substantially an inverted box with transverse partitions each of which holds a sensitive dry negative plate K. The slide 30 protects the plates from the light, and when box G is in place on slide support 31 whereon it can slide in suitable ways 48, one plate at a time can be dropped through slot 32 in support 31 into position inside of box 20 without being exposed at any time to the light. This is done by moving magazine G back as shown by the dotted lines in Fig. 4 until the last space which contains a plate K is over slot 32, with slide 30 closed, and by then withdrawing slide 30 the distance of one space. This can be accurately done by adjusting stud 37 and scale 38. When a dry plate is so dropped, it lands in a channel which is preferably made between thin strips of metal 33, 33 and it is caught and held therein by a latch 34. The latch 34 has a relatively long projection or arm which normally extends out under and between strips 33. The outer adjoining strip 33 is cut away to permit the arm of this latch to swing out sufficiently to clear the space between strips 33 whereby a negative plate held therein may be released. By moving negative plate magazine G forward, another plate can be dropped after the first one is disposed of and so on until magazine G is exhausted.

Focusing frame 22 is grooved or cut away at 25 just enough to allow glass 23 to project inside of strips 33, 33 to exactly the plane occupied by the inner face of the negative plate K when in position, so that the focus will be exactly the same. Frame 22 is also provided at its outer end with an opaque light slide 26 which can be slid out when it is desired to look through glass 23 to get the focus, and slid in to keep out the light.

The first process is to swing back both positive door 51 and sheet holder 52. The focus for the negative is then secured on glass 23 with door 21 closed and slide 26 open. This is done by moving slide D and lens C back and forth until the focus is correct. Slide 26 is now closed and focusing frame 22 is slid back as far as permitted by rim 24. A negative plate K is now dropped into place as described above. While a sensitive negative plate is held at the proper focus and in place by the latch 34, the bulb P, or other device for opening the shutter, is pressed and the picture is impressed upon the negative plate K.

The developing tank H slides transversely under box 20 in suitable grooves 110 therein and under a slot therein which is directly below latch 24 and slot 32. As soon as a negative plate is exposed, latch 34 is swung out of the way and the negative plate drops into compartment 40 of tank H which contains the developing fluid or solution. In this compartment 40 is a plate carrier 41 which is substantially a sheet metal box which fits loosely into compartment 40 and is of a size to receive a negative plate as it drops. This plate carrier 41 is provided close to its bottom with a sufficient number of holes 42 to admit the developing fluid freely. The walls of plate holder 41 preferably taper in toward the bottom and at a distance therefrom is a flap 43 which may or may not have holes 44. If it has such holes, they must be out of line with holes 42, whereby light is excluded but the developing fluid is not. After a negative plate is dropped, the sliding tank H is slid to the right, or left and slide cover 45 is slid over the top of plate carrier 41 which is then removed and held over another compartment 46. Here the cover is slid off and the plate dropped therein. This compartment contains the fixing bath. It is thus developed and fixed and is now taken out. Slide 30 is pushed in and magazine G is pushed forward out of the way and the fully developed negative, still wet, is replaced in position through slot 32 in box 20 on latch 34 and the focusing door 21 is opened to allow plenty of light to pass through the plate.

It is evident, that the light through the negative plate passing through the lens C, will form a picture somewhere inside of positive box 50. I obtain this focus on the positive focusing door 51 which is substantially a piece of ground glass in a frame, by moving slide D back and forth until the image is perfect. If a large picture is desired, positive box 50 may be slid out to the desired distance as it is attached to sliding frame 71. When the focus is obtained, I swing out positive door 51 and swing in sheet holder 52 which is so hung that it will strike the same point of focus as door 51. This sheet holder 52 comprises a hinged box open at the front. Inside is a board 53 which can be pushed in or out by handle 54 which projects through the front. I prefer to use in this box, a pad made up as follows. On the top is a protecting non-sensitive sheet 60 followed by a sensitive sheet 61 then a protecting sheet 60 and a sensitive sheet 61, etc. The protecting sheets extend above the sensitive sheets and are preferably bent over somewhat as shown.

Box 50 and sheet holder 52 are cut away somewhat at the top as shown in Fig. 2 at 56, so that the top of sheets 60, 61 can be reached. Box 50 is also cut away at the bottom at 58. Pins 57 project from the sides of holder 52, and limit the movement of the sheets and stop the front one at exactly the same focus as the glass of door 51 when in place.

It is better to manipulate the negative and the print under cover of the usual head cloth.

Sheet holder 52 is swung into place with a protecting sheet 60 in front. This is pulled out through slot 56 by the fingers as can be readily done on account of the fold at the top. This leaves sensitive sheet 61 in place against the pins 57 at the proper focus. Bulb P is now pressed and the print is taken from the negative, on the sheet 61.

Underneath box 50 I provide a tank L which I will call the positive tank and which is divided into three compartments 80, 81, 82 which contain respectively the developing fluid, the fixing fluid and plain water. The construction of tank L is substantially the same as tank H except that it has three compartments instead of two and I use no plate holder 41 with it. It has a rim at the top which fits in to suitable transverse grooves in ways under box 50. Tank L can be slid to the right or left to bring either compartment underneath slot 56. After the picture is impressed on a sheet 61, the tank L is moved so that the developing bath is directly underneath slot 56, when the sheet which has been exposed is pushed down through slot 58 into said bath by any suitable means as for instance by the tongs M. These tongs as shown in Fig. 8 are of ordinary spring metal with blades 90 and spring shanks 91 by which they can be manipulated from the top. They also are provided with a molding 92 which stops a sensitive sheet at the right point.

One blade is forced down behind sensitive sheet 61 and the other blade in front thereof until the top of the sheet comes in contact with molding 92. The tongs are squeezed together and as they continue to be pushed down, they carry the sheet along with them into compartment 80 of tank L which contains the developing fluid. The tongs are slowly opened up to allow the fluid to reach the sheet and after remaining a sufficient time there the tongs and sheet are withdrawn. Tank L is moved over until the fixing bath in compartment 81 is in position and sheet holder 52 can now be swung back for more convenient handling. Tongs and sheet are introduced into the fixing bath for a sufficient time and are then withdrawn. Tank L is again moved over and tongs and sheet are introduced into the compartment 82 in which is the washing bath, which finishes the process.

The principal feature of my invention is the use of the double action camera provided at one end with means for exposing the negative, a negative plate holder capable of holding a dry or a wet plate and a negative developing bath, and at the other end provided with a positive sheet holder and the positive developing bath. The exact construction of the baths and the means of introducing and withdrawing the plates and sheets therefrom may be varied without departing from the principle of my invention. My invention covers a complete photographic and developing outfit which can be used on the street, in parks and in other open places where a dark cabinet or dark room is not available and where the economy of space is important.

What I claim as my invention and desire to cover with Letters Patent is:—

1. In a developing camera, a stand, a lens and shutter slidably supported thereon, a collapsible negative bellows extended on one side of the lens, a negative box on the end of the bellows opposite the lens and in operative position with said lens, a positive bellows on the other side of said lens, and a positive box on the other end of the positive bellows from and in operative position with said lens, combined with a holder in the negative box and a focusing door for the negative plates, a tank provided with compartments and attached to the negative box, a positive sheet holder in the positive box, and a focusing door attached to the positive box, together with a developing tank divided into compartments and attached to said positive box.

2. In a developing camera, a stand, and a lens and shutter slidably supported thereon, combined with a collapsible negative bellows and a negative box at the end thereof opposite the lens, a focusing door for the negative bellows, and a developing tank provided with compartments and attached to the negative box, together with a collapsible positive bellows extending from said lens oppositely from the negative bellows and a box at the end thereof opposite the lens, a positive sheet holder and a focusing door for said second named box, and a developing tank provided with compartments and attached to the positive box.

3. In a developing camera, a stand, a lens and shutter slidably supported thereon, a collapsible negative bellows which extends from one side of the lens, a box at the end thereof, a negative plate magazine supported by said box, a glass focusing door carried by the negative box, a latch for holding a negative plate in position in said box, and a developing tank divided into compartments and slidable underneath the negative box, combined with a positive bellows and a positive box on the other side of the lens, a sheet magazine hinged to said positive box, and a glass focusing door hinged to the positive box.

4. In a developing camera, a stand, a lens and shutter slidably supported thereon, a collapsible negative bellows which extends from one side of the lens, a negative plate holder at the end of said bellows opposite the lens and adapted for holding a dry or a wet negative plate, a focusing door for the negative plate hinged to said negative plate holder, a developing tank provided with compartments and slidably mounted under the negative plate holder, means in the negative plate holder for supporting a negative plate but said supporting means being adapted to be moved to permit the plate to drop into said tank, and removable means for holding the plate and fitting in said tank, combined with a collapsible positive bellows extended on the other side of the lens, a sheet holder, a focusing door adapted to replace said sheet holder and a developing tank divided into compartments and slidably mounted under the said holder.

5. In a developing camera, an extensible stand, a lens and a shutter slidably supported thereon, a collapsible negative bellows which extends from one side of the lens, a negative box at the end of the bellows opposite the lens and formed with parallel slots at the top and bottom and channels connecting said slots, a plate magazine slidably mounted on the top of said box and over the top slot therein, a latch in line with the lower slot in said box, a focusing door at the back of said box and hinged thereto, a slidable focusing frame therein, a developing tank provided with compartments and slidable under the negative box and under the lower slot therein, a plate carrier in said tank provided with a flap and with holes to admit the passage of liquid but so arranged as not to admit the light, combined with a collapsible positive bellows on the other side of said lens, a positive box at the outer end thereof, a focusing door hinged thereto, a sheet magazine hinged to said positive box, and a developing tank divided into compartments and slidably mounted under said positive box.

6. In a developing camera, an extensible stand, a lens and shutter slidably supported thereon, a collapsible negative bellows which extends from one side of said lens, a negative box at the other end of the negative bellows from and opposite said lens and provided inside with vertical channels for the negative plates and a slot over the channels and a bottom slot under the channels, a latch adapted to hold a negative plate in said channels, a focusing door hinged to said box, a focusing frame slidable in said door, a light slide therefor, a negative plate magazine slidably mounted on top of the negative box and comprising a slide at its bottom, a developing tank divided into compartments and slidable under the bottom slot in said box, and a plate carrier in one of said compartments and formed with holes and a flap, combined with a collapsible positive bellows extending on the other side of said lens, a positive box at the outer end thereof, a positive focusing door hinged at the back of said positive box, a sheet holder hinged to said positive box and having check pins for the positive sheets, a board for supporting the positive sheets slidable in said sheet holder and having a handle which projects through the back of said box, and a developing tank divided into compartments and slidably mounted under said positive box.

7. In a developing camera, a stand, a box at one end thereof formed with vertical channels and with slots connecting the tops and bottoms respectively thereof together with grooves parallel with the bottom slot, a collapsible bellows extended along said stand from one side of the box, a lens and shutter at the other end of said bellows from said box and slidable on said stand, a latch in line with and above the lower slot in said box, an opaque focusing door in which is an opening, said door being at the back of said box and hinged thereto, a focusing frame slidable in said opening, and an opaque slide for said frame, combined with a developing tank provided with compartments and slidable in said grooves as described.

8. In a developing camera, a stand, a box at one end thereof and cut away at the top and bottom and formed with transverse grooves thereunder at the outer end, a collapsible bellows extended on the inner end and along said stand, a lens and shutter slidable on said stand at the inner end of the bellows, combined with a focusing door at the back of said box and hinged to one edge thereof, a sheet holder at the back of said box and hinged to another edge thereof and having check pins, a board slidable in said sheet holder and having a handle which projects through the back of said box, sensitive and nonsensitive sheets in said box, and a developing tank divided into compartments and slidably mounted under said box and in the transverse grooves thereunder.

9. In a developing camera, a lens and shutter, a collapsible bellows extending on one side thereof, an opaque box at the other end of said bellows from said lens, removable means attached to said box for ascertaining a focus, means in said box for holding a dry or a wet negative plate at said focus, closure means for excluding the light from said box, an opaque tank so attached to said box that the negative plate may be dropped thereinto without exposure to the light, combined with another bellows extending on the other side of said lens, an opaque box at the outer end of said bellows, removable means attached to the latter box named and for ascertaining a focus, removable means for holding a sensitive sheet at said focus without exposure to the light, an opaque developing tank attached to said latter box and adapted for holding said sheet during development and without exposure to the light.

10. In a developing camera, a lens and shutter, a negative bellows which extends on one side of the lens, an opaque box at the end thereof, means for ascertaining a focus in said box, means for holding a negative plate at said focus, and means attached to said box for holding the negative plate during development and without exposure to the light, together with a positive bellows which extends on the other side of said lens, an opaque box at the end thereof, together with means for ascertaining a focus, means for holding a sensitive sheet at said focus, and means for holding said sensitive sheet during development and attached to the latter opaque box named and so arranged as to at times exclude the light as described.

In testimony whereof I hereto affix my signature in presence of two witnesses.

SOLOMON D. HAJJAR.

Witnesses:
GARDNER W. PEARSON,
HELEN V. FLEMING.